June 24, 1958      B. F. CAMPBELL      2,840,435
CABINET STRUCTURE FOR A TESTING APPARATUS
Filed March 5, 1956      3 Sheets-Sheet 2
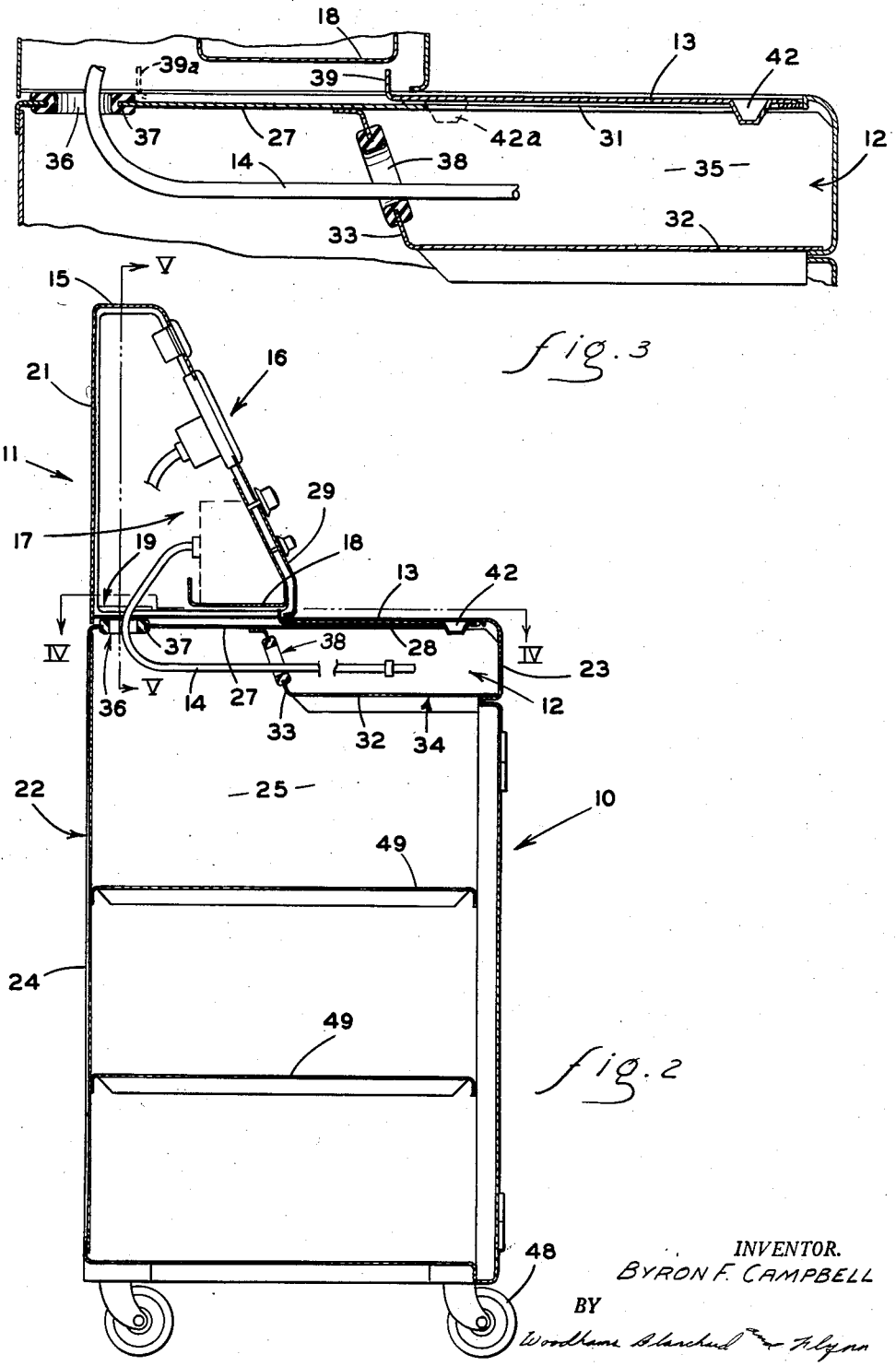
INVENTOR.
BYRON F. CAMPBELL June 24, 1958      B. F. CAMPBELL      2,840,435
CABINET STRUCTURE FOR A TESTING APPARATUS Filed March 5, 1956      3 Sheets-Sheet 3

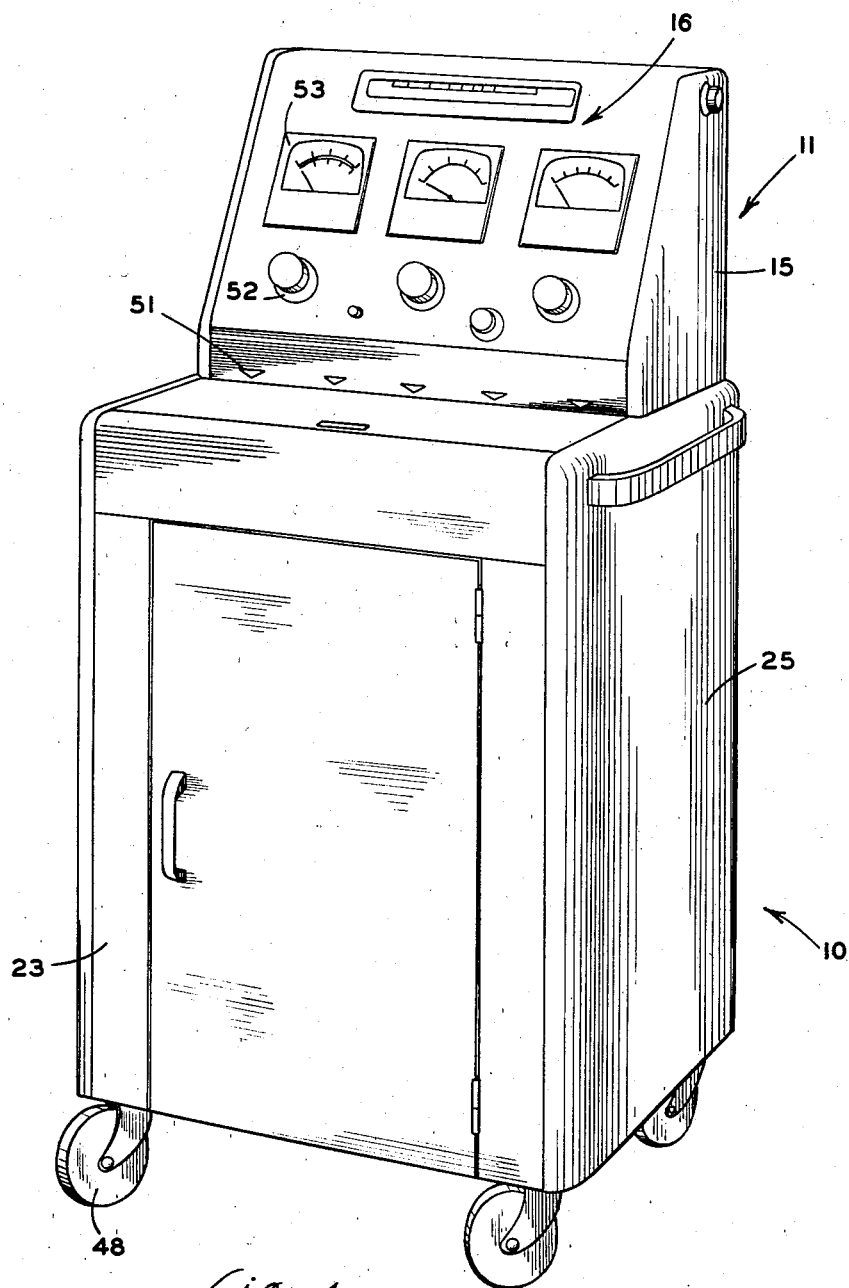

INVENTOR.
BYRON F. CAMPBELL
BY
Woodhams Blanchard & Flynn
ATTORNEYS

United States Patent Office 2,840,435
Patented June 24, 1958

2,840,435

CABINET STRUCTURE FOR A TESTING APPARATUS

Byron F. Campbell, Kalamazoo, Mich., assignor to Allen Electric & Equipment Company, Kalamazoo, Mich., a corporation of Michigan Application March 5, 1956, Serial No. 569,560

2 Claims. (Cl. 312—279)

This invention relates in general to a cabinet structure for apparatus having an instrument panel and a plurality of elongated, flexible test cables or conduits. More particularly, it relates to a cabinet for supporting an apparatus for testing automotive equipment and having a plurality of compartments in which the testing cables or conduits from said apparatus can be easily stored when not in use.

Persons, such as garage mechanics, who use test apparatus for checking automotive equipment, have always been troubled with the problem of storing the test cables or conduits to get them out of sight and out of the way when not in use. The conventional test units usually have an enclosure of some type, with an instrument panel on the front surface. Usually the test cables or conduits, sometimes called "leads," are either integral with the apparatus and extend through an opening in a wall of the enclosure, or they are detachable and plug into a receptacle on the surface of the enclosure. In both cases, as a rule, either there is no storage space for the leads within the enclosure, or the storage space is inadequate. For example, the storage space in some units is quite small and can be used for storing the leads only if they are carefully folded and/or coiled before storing. Most users of this type of equipment have neither the time nor the inclination to exercise such care after each use of the equipment. In the majority of the units having some storage space, the leads are usually shoved through an opening in the rear of the enclosure, on top of the test apparatus. Where the test apparatus includes delicate electrical mechanisms, this method of storing is unsatisfactory at best, and may endanger both the equipment and the personnel who operate it. Furthermore, the integral types of leads often have a part of their length on the outside of the testing unit, even when they are in a stored position. This exposes the leads to accidental snagging and resultant damage during movement of the unit.

A further conventional manner of positioning the leads or conduits when not in use is to drape them over the test unit. In such position, they are easily brushed onto the floor where they may soon become damaged and dirty.

Thus, the need for a convenient, compact and adequate storage space for the leads of a test unit is apparent.

Accordingly, a primary object of this invention is to provide a cabinet structure for testing apparatus having leads or conduits, said structure providing a storage space in which the leads can be easily and quickly stored by the user of the apparatus after each use, said storage space being conveniently located at the front of the test unit adjacent to the instrument panel thereof.

A further object of this invention is to provide a cabinet structure, as aforesaid, having an upper portion, which houses the test apparatus, and having a lower portion, which supports the test apparatus and houses the leads when not in use, the lower portion of the structure being adapted for use with a variety of different apparatuses and/or upper portions with little, if any, structural modifications.

A further object of this invention is to provide a cabinet structure, as aforesaid, which is easy and inexpensive to construct, which is simple to use, and which overcomes the storage problems previously encountered with testing units having test leads or conduits.

Other objects and purposes of this invention will become apparent to persons familiar with this type of equipment upon reading the following specification and examining the accompanying drawings, in which:

Figure 1 is an oblique view of a cabinet embodying the invention.

Figure 2 is a central, cross-sectional view taken along the line II—II of Figure 4 and rotated 90° clockwise.

Figure 3 is an enlarged view of a fragment of Figure 2.

GENERAL DESCRIPTION

Figure 4:
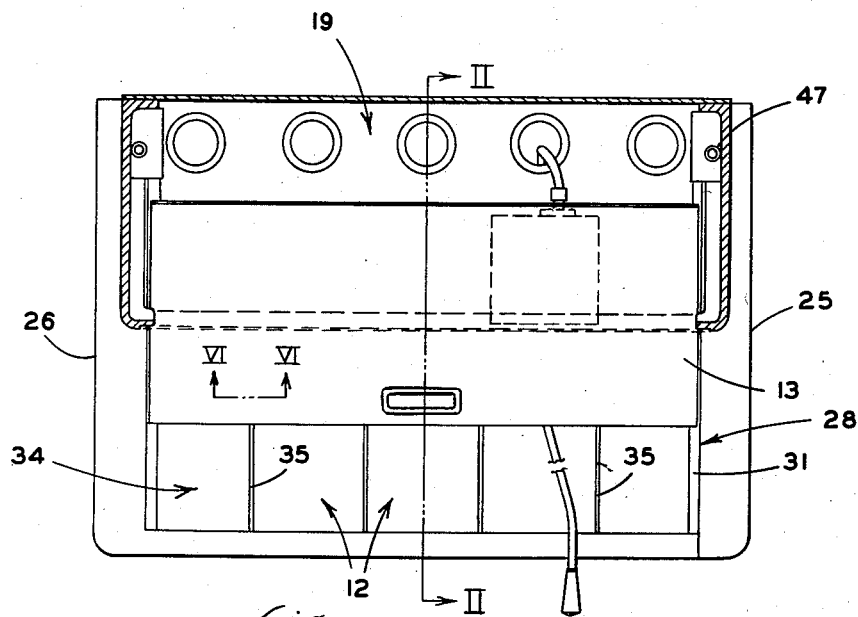
Figure 4 is a sectional view taken along the line IV—IV of Figure 2.

In order to meet the objects and purposes set forth above, as well as others related thereto, there is provided a portable base 10 (Figures 1 and 2), upon which the test unit 11 is removably mounted. The upper portion of the base 10 is provided with one or more upwardly opening compartments 12. The compartments are adapted to be closed by a closure member 13, which in this embodiment is disposed at the top of said compartments and is slidably arranged between the test unit 11 and the base 10. Suitable openings are provided, both in the base 10 and the test unit 11, through which the leads 14 of the test unit 11 may extend from said unit directly into one of said compartments 12, from which the leads 14 become easily accessible by opening the closure member 13, as will become evident.

For the purpose of convenience in description, the terms "upper," "lower," "front," "rear," and derivatives thereof, as used herein, will have reference to the structure as appearing in Figure 1. The terms "inner," "outer," and derivatives thereof, will have reference to the geometric center of said structure and parts thereof.

Detailed construction

Figure 5:
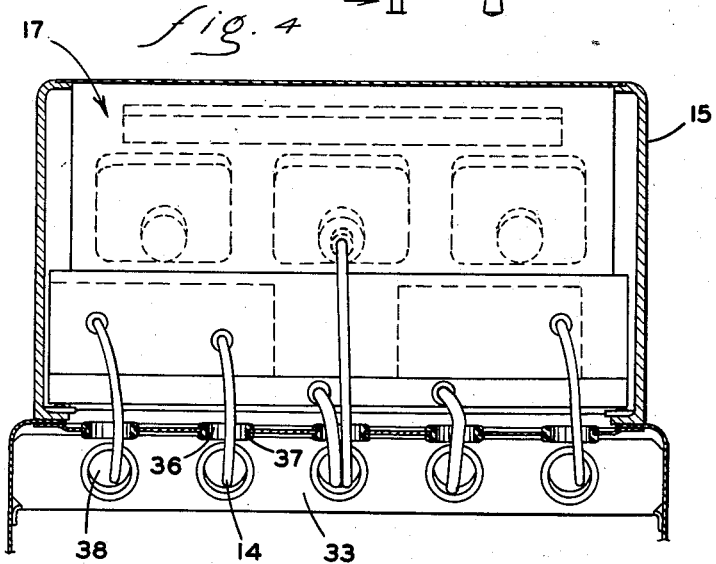
Figure 5 is a sectional view taken along the line V—V of Figure 2.

The test unit 11 (Figures 1, 2 and 5) may be of any convenient, conventional type having an outer casing 15 supporting an instrument panel 16 and enclosing appropriate test mechanism 17. However, the test mechanism 17 must be so supported, as by means of the shelf 18, within the casing 15 that it is spaced upwardly a slight distance from the lower edges of the casing 15, for reasons appearing hereinafter. Also, a suitable open space 19 must be provided through the bottom of the casing 15, as between the rear end of the shelf 18 and the rear wall 21 of the casing 15, through which the leads 14 may extend.

The base 10 comprises a cabinet 22, which may be of open construction but is here shown closed by a front wall 23, rear wall 24 and a pair of side walls 25 and 26. The cabinet 22 also includes a top wall 27, with a large opening 28 therein (Figures 2 and 4), extending substantially between the side walls 25 and 26 and being adjacent to the front wall 23. In this particular embodiment, the test unit 11 is supported upon the cabinet 22 between the rear wall 24 and the rearward edge of the top wall opening 28. The front panel 29 of the casing 15 is spaced slightly above the adjacent surface of the top wall 27 to permit the rearward and forward sliding of the closure member 13 disposed between said test unit and said base.

The closure member 13 is, in this embodiment, slidably supported along its lateral edges upon slide rails 31 (Figures 3 and 4) for movement between positions as shown in solid and broken lines in Figure 3. As shown in Figures 3 and 4, the compartments 12 are provided within the base cabinet 10 adjacent to the upper end thereof and communicating with the top wall opening 28. The compartments have a common bottom wall 32, which is secured to, and extends rearwardly from, the front wall 23 of the cabinet 22 to a point, in this particular embodiment, slightly beyond the rear edge of the top wall opening 28. The compartments 12 are provided with a common rear wall 33 (Figure 2), which extends between, and is secured to, the rear edge of the bottom wall 32 and the top wall 27 of the cabinet 22. The bottom wall 32, rear wall 33, upper portion of the front wall 23, and the side walls 25 and 26 combine with the closure member 13, as shown in Figures 3 and 4, to provide an elongated enclosure 34 extending along the upper front portion of the base 10 and within the cabinet 22 thereof. The enclosure 34 is divided into a plurality of compartments 12 by a plurality of parallel, upright partitions 35, which extend from the front wall 23 to the rear wall 33. The various frame elements of the base 10 and the test unit 11, such as those set forth hereinabove, may be fabricated from any convenient, conventional type of relatively rigid sheet material, such as metal, wood or plastic, and said elements may be secured together in a manner convenient and conventional to the type of materials used.

The top wall 27, preferably beneath the open space 19 in the unit casing 15 is, in this embodiment, provided with a plurality of lead openings 36, each of which openings may be provided with a resilient liner 37, such as a rubber grommet. The rear wall 33 of the compartments 12 is, in this embodiment, also provided with a plurality of lead openings 38, preferably equal in number both to the number of said compartments 12 and the number of lead openings 36 in the top wall 27. Of course, the groups of individual lead openings here shown at 36 and 38 may be combined into single larger openings as may be desired for ease of fabrication and assembly. As shown particularly in Figures 3 and 5, the test leads 14 extend from the unit test mechanism 17 through the lead openings 36, the respective lead openings 38, and into the respective compartments 12, as shown in Figure 3.

The closure member 13 is provided with an upwardly extending flange 39 (Figure 3) along its rearward edge, which may be utilized for limiting rearward movement of the closure member 13, as indicated by the position of said flange 39, shown in broken lines at 39a in Figure 3. A recess 42 is provided in the closure member 13. The recess 42, which extends downwardly, provides a means whereby the closure member 13 may be manually engaged for causing sliding movement thereof. The walls of said recess 42 may also provide a means for limiting the rearward movement of the closure member 13 by engaging that edge of the top wall 27 adjacent to the top wall opening 28, as shown in broken lines at 42a in Figure 3.

Figure 6:
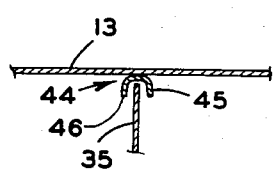
Figure 6 is a sectional view taken along the line VI—VI of Figure 4.

Appropriate guide means 44 (Figure 6) is provided for maintaining alignment between the closure member 13 and the enclosure 34 while said closure member is being slid forwardly and rearwardly upon the upper surface of the base 10. Here, said guide means 44 is comprised of a small, channel-shaped element 45, which is secured in a conventional manner to the under surface of the closure member 13 with its flanges 46 embracing the opposite sides of the upper edge of one of the partitions 35. One or more of said guide means 44 may be provided along the closure member 13, as desired or required. The test unit 11 is removably supported upon, and secured to, the base 10 by any convenient, conventional means, such as the bolts 47 (Figure 4). The base 10 may be movably supported upon any convenient means, such as the casters 48, and may be provided with shelves 49, as desired or required.

Operation

Before operating the structure embodying the invention, the test unit 11 is first mounted upon, and secured to, the base 10. The leads 14 are threaded through their respective lead openings 36 and 38 into their respective compartments 12, as shown in Figures 2 and 3. When not in operation, the leads 14 remain within their respective compartments 12, and the closure member 13 is normally closed as shown in Figure 3.

When it becomes desirable to use the test equipment, the operator moves the closure member 13 in a rearward direction, thereby exposing all of the leads 14 within their respective compartments 12. The operator then selects that lead or group of leads that he desires for carrying out whatever test is desired. Test indicators 51 (Figure 1) may be provided on the front panel 29 of the unit casing 15 for the purpose of advising the operator as to which test leads should be used in any particular circumstance. Such test indicators may also be utilized for associating a particular lead or leads with the control knobs or visual indicators 52 and 53, respectively, on the test unit. Having selected the desired leads 14, the closure member 13 may be returned forwardly, if desired, to a position where sufficient room is provided for the leads to extend out of the compartments 12, while at the same time preventing foreign materials from dropping into the compartments, and providing a shelf space, as may be desired, during the test operation. At the termination of the test operation, the closure member 13 is again moved rearwardly, the leads 14 are returned to their respective compartments and the closure member 13 is closed. The leads 14 are now completely out of sight and out of any possible danger, either to themselves, to the equipment, or to operators using the equipment.

Obviously, the particular shape, design, character and use of the test unit 11 is immaterial to this particular invention, so long as said test unit is capable of support upon a base 10, such as that shown here. Likewise, the number, character and type of leads 14 utilized is also immaterial, so long as an extension-type of lead is required in the testing operation. For example, the leads may be hollow tubes, electrical conduits, or both, and the term "leads" in the hereinafter appended claims shall, unless otherwise expressly limited, be understood to include any of such specific devices.

Although a particular, preferred embodiment of the invention has been disclosed herein for illustrative purposes, it will be understood that variations or modifications thereof, which lie within the scope of such invention, are fully contemplated unless specifically stated to the contrary in the appended claims.

I claim:

1. A base structure for use with a testing apparatus having an instrument panel and a plurality of elongated, flexible leads extendable therefrom, comprising: a cabinet having front, rear and side walls; a top plate on said cabinet, said top plate having a large opening therethrough adjacent said front wall and having a series of ports therethrough adjacent said rear wall; partition means including portions of said front and side walls defining a plurality of upwardly opening, substantially parallel compartments within the upper portion of the cabinet below said large opening; means defining ports through the rear walls of each of said compartments, said ports in said compartments being aligned with the ports in said top plate; a slidable cover plate for closing said large opening, said cover plate being slidably mounted on top of said top plate and being adapted to slide toward said rear wall to expose said large opening; means adjacent the ports in said top plate for blocking movement of said cover plate toward said rear wall before said cover plate overlies said ports in said top plate; means for supporting said testing apparatus on said cabinet above said top plate and spaced vertically from said cover plate so that said cover plate may slide freely thereunder, each of the leads from said testing apparatus being extendable, respectively, through a port in said top plate and through an aligned port in one of said compartments.

2. A base structure for use with a testing apparatus having an instrument panel and a plurality of elongated, flexible leads extendable therefrom, comprising: a cabinet having front, rear and side walls; a top plate on said cabinet, said top plate having a large opening therethrough adjacent said front wall and having a series of ports therethrough adjacent said rear wall; partition means including portions of said front and side walls defining a plurality of upwardly opening, substantially parallel compartments within the upper portion of the cabinet below said large opening; means defining ports through the rear walls of each of said compartments, said ports in said compartments being aligned with corresponding ports in said top plate; a resilient ring lining each of the ports in said top plate and said compartments, the rings on said ports in said top plate extending about the upper surface of said top plate; a slidable cover plate for closing said large opening, said cover plate being slidably mounted on top of said top plate and being adapted to slide toward said rear wall to expose said large opening; an upturned lip on the rearward edge of said cover plate, said lip being adapted to abut against the resilient rings lining the ports in said top plate to limit rearward movement of said cover plate; a housing for said testing apparatus on said cabinet and extending upwardly from said top plate, said housing including a front member extending upwardly from said top plate, said front member being engagable with said lip to limit forward movement thereof; and a shelf secured to said front member for supporting a test unit, said shelf extending substantially parallel with said top plate and being spaced vertically therefrom to permit said cover plate to slide thereunder.

References Cited in the file of this patent
UNITED STATES PATENTS

| | | |
|---|---|---|
| 1,925,725 | Auerbach | Sept. 5, 1933 |
| 2,287,058 | Pieper | June 23, 1942 |
| 2,500,095 | Ries | Mar. 7, 1950 |